United States Patent
Burnett et al.

[11] Patent Number: 5,906,691
[45] Date of Patent: May 25, 1999

[54] INDUCTION HARDENED MICROALLOY STEEL HAVING ENHANCED FATIGUE STRENGTH PROPERTIES

[75] Inventors: Michael E. Burnett, Magnolia, Ohio; Carl F. Musolff, Ashville, N.Y.

[73] Assignees: The Timken Company, Canton, Ohio; Cummins Engine Company, Inc., Columbus, Ind.

[21] Appl. No.: 08/913,534
[22] PCT Filed: Jul. 1, 1997
[86] PCT No.: PCT/US97/11386
§ 371 Date: Sep. 16, 1997
§ 102(e) Date: Sep. 16, 1997
[87] PCT Pub. No.: WO98/00570
PCT Pub. Date: Jan. 8, 1998

Related U.S. Application Data

[60] Provisional application No. 60/021,177, Jul. 2, 1996.
[51] Int. Cl.$^6$ ............... C21D 9/30; C21D 1/42; C22C 38/12
[52] U.S. Cl. ............ 148/567; 148/572; 148/639; 148/904; 148/320; 148/328
[58] Field of Search ............ 148/567, 570, 148/572, 622, 639, 328, 320, 663, 904

[56] References Cited

U.S. PATENT DOCUMENTS

| | | | |
|---|---|---|---|
| 3,222,229 | 12/1965 | Pribyl | 148/663 |
| 4,043,847 | 8/1977 | Just | 148/904 |
| 5,545,267 | 8/1996 | Ochi et al. | 148/904 |
| 5,667,605 | 9/1997 | Bellus et al. | 148/644 |

FOREIGN PATENT DOCUMENTS

| | | |
|---|---|---|
| 5263128 | 10/1993 | Japan . |
| 5263129 | 10/1993 | Japan . |
| 730867 | 4/1980 | Russian Federation ...... 148/904 |

OTHER PUBLICATIONS

Japanese Patent Laid–Open No. 5–263128, Abstract, Oct. 12, 1993, 1 p., English language.
Japanese Patent Laid–Open No. 5–263129, Abstract, Oct. 12, 1993, 1 p., English language.

*Primary Examiner*—Deborah Yee
*Attorney, Agent, or Firm*—Webb Ziesenheim Logsdon Orkin & Hanson, P.C.

[57] ABSTRACT

Improved fatigue strength properties are achieved in an induction hardened microalloy steel useful for demanding service environments. The microalloy steel has low carbon and sulfur contents, comprising in % by weight, 0.15% to 0.45% C, 0.50% to 1.60% Mn, up to 0.20% V, 0.0001% to 0.01% S, balance Fe. The material is fabricated to a selected configuration, such as an engine crankshaft, for example. Selected surfaces of the fabricated article are hardened by induction heating. The article can be used directly after induction hardening or it may be tempered at low to moderate temperatures of from about 100° C. (200° F.) to 290° C. (550° F.) to achieve a desired surface hardness and compressive residual stress level. The controlled alloy chemistry and low tempering temperature provide a substantial increase in bending fatigue strength over conventional higher carbon grade steels.

15 Claims, 6 Drawing Sheets

INDUCTION HARDENED MICROALLOY STEEL HAVING ENHANCED FATIGUE STRENGTH PROPERTIES

CROSS REFERENCE TO RELATED APPLICATION

This application claims the benefit of Provisional Application Ser. No. 60/021,177, filed on Jul. 2, 1996 and entitled "Improved Fatigue Strength Properties in Induction Hardened Microalloy Steel".

BACKGROUND OF THE INVENTION

The present invention relates generally to microalloy steels and, more particularly, to microalloy steels that can be forged and subsequently surface hardened by induction heating. Microalloy forging steels have been finding increasing usage in many applications, but perhaps the fastest growing domestic microalloy application is that of gasoline and diesel engine crankshafts. Most new crankshaft applications specify microalloy steel, and many current applications are being converted from cast iron or forged and heat treated plain carbon or alloy steels to as-forged microalloy steels. The engines range from small automotive to large diesel engines. Induction hardening is applied mainly in the larger diesel engine size ranges to enhance fatigue strength of the bearing and crankpin fillets. It has been previously shown that a microalloy steel could uniformly attain the necessary core properties for large diesel engine crankshafts in the as-forged condition. However, until recently, the induction hardening characteristics of the as-forged microalloy crankshaft and resultant fatigue life had not been fully studied.

Induction hardening is a selective hardening process that has been traditionally applied to plain carbon and alloy steel components to increase the local hardness in highly stressed regions of the part. During induction hardening, the surface region of the part adjacent to the induction coil is rapidly heated to within the austenite regime, held at temperature for a brief period of time, and then rapidly quenched. The goal is to fully austenitize the heated region to a specified depth, and then form a martensitic structure in the heated region during the quench. The part is then tempered to the desired case hardness. The final strength/hardness of this induction hardened region has been the primary design criteria used to predict or establish the life of the part. Typically, the fatigue strength is considered to be approximately ½ that of the tensile strength of the hardened region. Whereas this general rule gives a good approximation of the performance characteristics of the part, optimizing the fatigue strength of an induction hardened component requires an understanding of how a number of metallurgical factors influence fatigue. In addition to the strength of the hardened region, the cleanliness of the steel and the resultant residual stress state in the highly stressed region will affect fatigue performance. Additionally, an understanding of how the induction hardening process affects the microalloy precipitate distribution in the base material is of importance.

With the progression towards cleaner steels in recent years, the effect of material cleanliness on bending fatigue is tending to play a smaller overall role with respect to fatigue properties. Whereas the oxide level has been dramatically decreased, the use of some level of sulfur to aid in machinability is still widely accepted in the art for many applications. Crankshafts in particular are subjected to a variety of forging and subsequent machining operations. Therefore, the use of sulfur is critical to allow the productive drilling of various holes required in a finished crankshaft. The presence of sulfides in steels has been known to play an insignificant role in regard to fatigue due to the lack of significant stress field around this type of inclusion. Heretofore, it has been shown that sulfides can actually improve fatigue resistance when they act to displace or coat more harmful oxide-type inclusions. However, in very clean steels, sulfides have been reported to initiate fatigue, and decreasing sulfur level has been shown to improve the endurance limit in both carburized and through-hardened steels. It is, therefore, of benefit to characterize the role of sulfur in the ultra clean air melt steels to find the proper balance between machinability and fatigue strength in critical applications.

Induction hardening to increase the hardness in fatigue critical regions of components also influences the resultant residual stress state. The expansion that accompanies the austenite to martensite transformation in the induction heated surface region normally results in a highly compressive residual stress at the hardened surface. This compressive stress, in combination with the increased hardness level, further enhances the fatigue strength of the component. Since a tensile stress is required to initiate a fatigue crack, the applied stress must overcome both the residual compressive stress present at the surface and the inherent strength of the steel to initiate a crack. One prior art investigator, Koster, "Surface Integrity of Machined Materials", Technical Report AFML-TR-60 (1974), working with SAE 4340 steels hardened to 50 HRC over a wide range of surface residual stress states, reported a near linear relationship between residual stress level and bending fatigue strength. It is also reported in the prior art that relaxation of harmful tensile residual stress by annealing will improve the fatigue strength for the finished part.

SUMMARY OF THE INVENTION

Component bending fatigue results obtained from induction hardened microalloy steel crankshafts have indicated that factors beyond the hardness and/or strength of the induction hardened regions of the crankpins have an influence on fatigue strength. Both the carbon and sulfur levels of the base material, and the residual stress level present in the induction hardened case have a significant effect on the resultant fatigue strength of the component. Residual stress relaxation has, in turn, been found to be a function primarily of tempering temperature and secondarily of steel composition. These results confirm that the application of a lower carbon microalloy steel such as TMS-80™ (a trademark of The Timken Company) to induction hardened components, allowing for a subsequent reduction in tempering temperature (and corresponding increase in case compressive residual stress level) to achieve the required hardness level, results in a substantial increase in bending fatigue strength over that of a conventional higher carbon grade. The sulfur content of the steel is maintained as low as possible, for example, as low as 0.001 wt. %, to further enhance the fatigue strength of the finished part.

The microalloy steel employed in the present invention has an overall preferred compositional range in wt. % of:

0.15% to 0.45% carbon, 0.50% to 1.60% manganese, 0.0% to 0.20% vanadium, 0.001% to 0.10% sulfur, balance essentially iron;

and more preferred compositional ranges of:

0.20% to 0.35% carbon, 1.00% to 1.50% manganese,
0.05% to 0.15% vanadium,
0.001% to 0.06% sulfur,
balance essentially iron.

Following fabrication and induction surface hardening, the fabricated part is given a low to moderate temperature tempering treatment preferably between about 200° C. (400° F.) to about 290° C. (550° F.) provide superior bending fatigue strength properties. The tempering temperature may be increased up to about 350° C. (660° F.). Alternatively, the fabricated part may be placed into service directly after induction hardening without tempering, particularly in applications where the service temperature is elevated. In such service applications, the article will undergo tempering in situ during service.

A complete understanding of the invention will be obtained from the following description when taken in connection with the accompanying drawings.

DETAILED DESCRIPTION OF THE INVENTION

Figure 1:
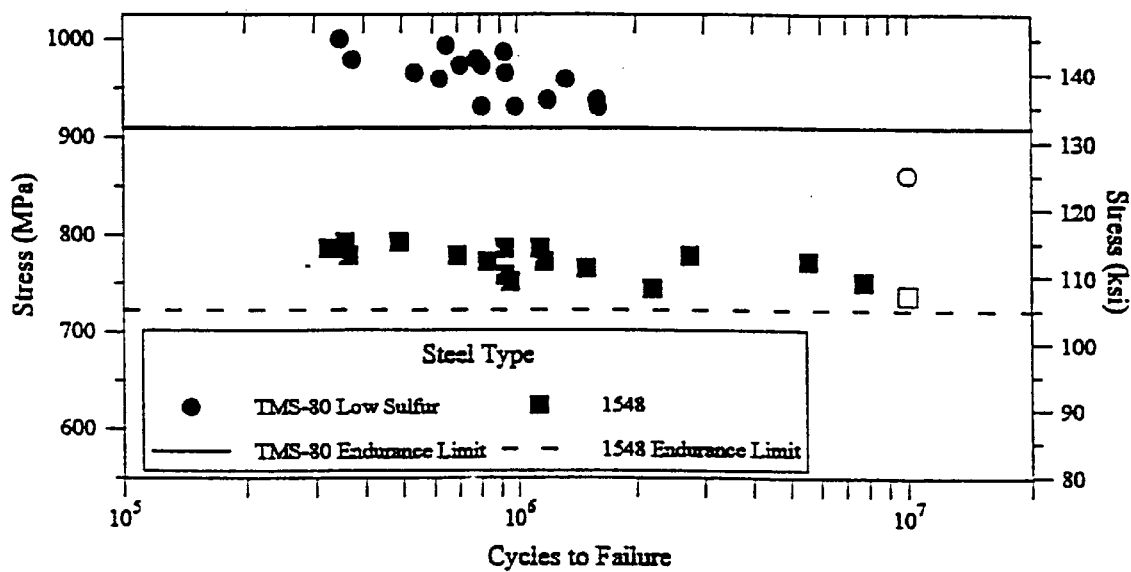
FIG. 1 is a graph of an S/N curve for fatigue tested crankpin sections from the low sulfur TMS-80 heat 12674 and the baseline 1548 heat X8814, open symbols represent a run-out condition.

The work which led to the present invention was undertaken to determine the factors influencing fatigue strength of an induction hardened microalloy steel and whether the crankshaft fatigue life currently obtained with a plain carbon steel could be increased in the microalloy steel. The present investigation used mainly production microalloy steels and crankshaft processing techniques, with the fatigue results determined on the crankpin sections of the crankshafts. Crankshafts manufactured from as-forged TMS-80™ microalloy steel with varying sulfur levels were compared to crankshafts manufactured from conventional normalized SAE 1548 steel.

Procedure. Production crankshafts were manufactured from two heats of SAE 1548 and three heats of TMS-80 steel. The three heats of TMS-80 contained sulfur contents of 0.007%, 0.020% and 0.039%, hereinafter referred to as low sulfur, medium sulfur and high sulfur, respectively. The steel heat chemical compositions are listed in Table I. All of the steels were air melted in electric arc furnaces and ingot cast into bottom poured 711 mm (28") square ingots, except for heat 12674 which was top poured into 508 mm (20") square ingots. The ingots were then rolled to 152 mm (6") round corner square forging billets. The billets were induction heated to approximately 1315° C. (2400° F.) and forged on a 16,000 tonne mechanical screw press. The SAE 1548 parts were subsequently normalized, with an austenitization temperature of 900° C. (1650° F.) and four hours in the furnace. The parts made from TMS-80 microalloy steel were cooled following forging at an average rate of approximately 28° C./minute (50° F./minute).

TABLE I

Chemical Composition of the Steel Heats (Weight Percent)

| Type | Heat | C | Mn | S | Si | Cr | Ni | Mo | Cu | Al | V |
|---|---|---|---|---|---|---|---|---|---|---|---|
| IMS-80 | 12674 | 0.30 | 1.47 | 0.007 | 0.25 | 0.10 | 0.08 | 0.04 | 0.09 | 0.008 | 0.11 |
| TMS-80 | T1498 | 0.31 | 1.39 | 0.020 | 0.27 | 0.10 | 0.13 | 0.04 | 0.16 | 0.029 | 0.10 |
| TMS-80R | T1044 | 0.29 | 1.39 | 0.039 | 0.25 | 0.12 | 0.11 | 0.05 | 0.13 | 0.038 | 0.10 |
| SAE 1548 | X8814 | 0.46 | 1.34 | 0.024 | 0.20 | 0.10 | 0.12 | 0.04 | 0.18 | 0.033 | — |
| SAE 1548 | T0509 | 0.46 | 1.30 | 0.022 | 0.18 | 0.10 | 0.13 | 0.05 | 0.16 | 0.031 | — |

The crankshaft forgings were machined, induction hardened, ground, and lapped on production equipment. The fillets and outer diameters of both the main and crankpin journals were hardened, achieving a maximum surface temperature of approximately 1010° C. to 1040° C. (1850° F. to 1900° F.) with an induction heating cycle time of approximately 22 seconds. Parts were tempered for three hours at 357° C. (675° F.) and 246° C. (475° F.) for the SAE 1548 and TMS-80 steels, respectively. Except for this tempering temperature difference, all of the other manufacturing procedures were identical for the two materials. Batches of both materials were also processed at the same time to minimize the influence of any unintentional variations.

Sections of the crankshaft were fatigue tested, with the critical region of the crankpin fillets experiencing fully reversed bending. The applied stress was determined by placing strain gauges in the fillets of calibration samples. Individual tests were concluded when the sample failed or when reaching a run-out condition at $10^7$ cycles.

Figure 2:
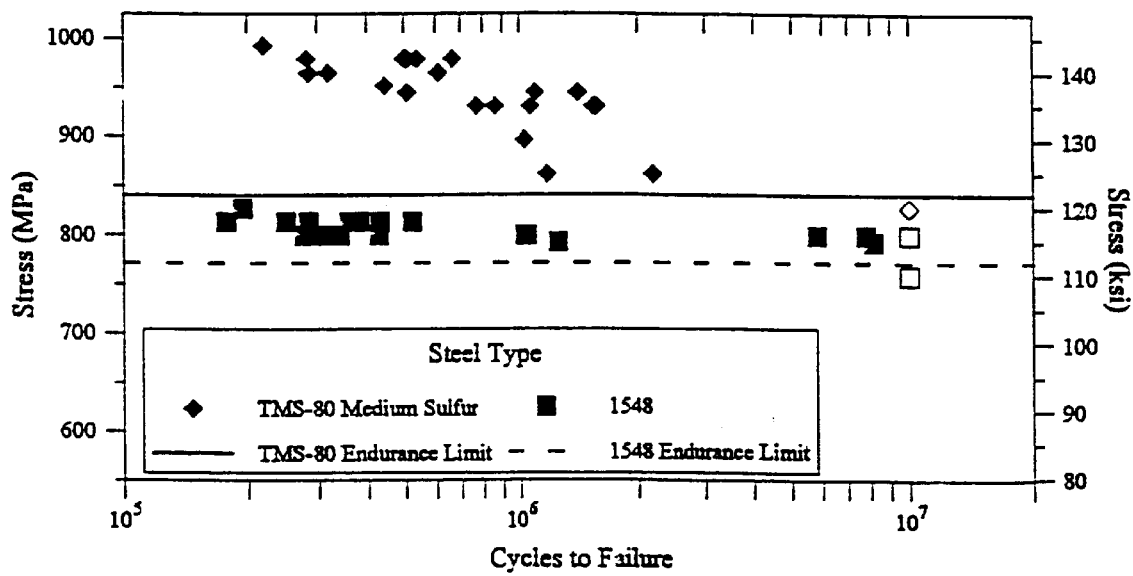
FIG. 2 is a graph of an S/N curve for fatigue tested crankpin sections from the medium sulfur TMS-80 heat T1498 and the baseline 1548 heat T0509, open symbols represent a run-out condition.
Figure 3:
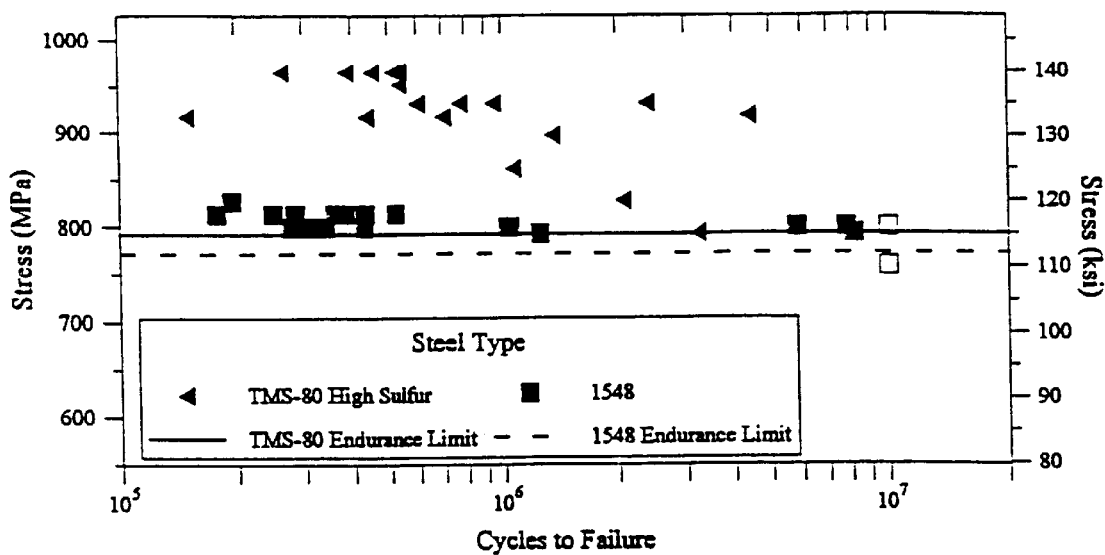
FIG. 3 is a graph of an S/N curve for fatigue tested crankpin sections from the high sulfur TMS-80 heat T1044 and the baseline 1548 heat T0509, open symbols represent a run-out condition.
Figure 4:
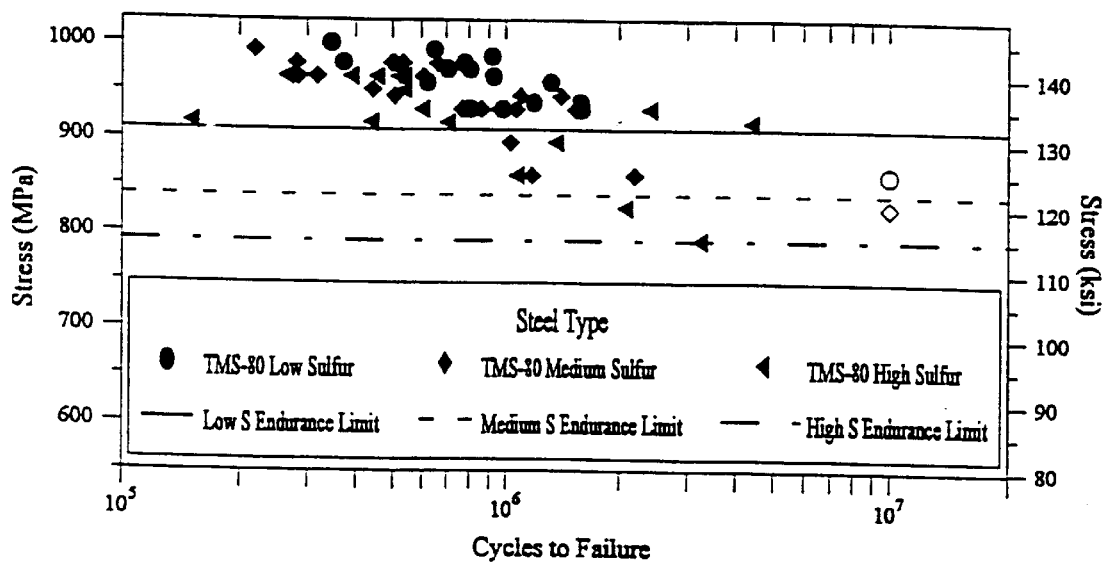
FIG. 4 is a graph of an S/N curve for fatigue tested crankpin sections from all three sulfur TMS-80 heats (12674, T1498 and T1044), open symbols represent a run-out condition.

Results. S/N-type fatigue curves (plotting stress versus the number of cycles to failure) of the TMS-80 versus the baseline SAE 1548 data for each sulfur level of TMS-80 microalloy steels are shown in FIGS. 1 to 3. A combined plot for all three sulfur levels of the TMS-80 microalloy steels is shown in FIG. 4. The estimated endurance limit from each of the tests is also indicated on each plot. The results of this testing clearly indicates that the crankshafts manufactured from the TMS-80 microalloy steel has a significantly higher endurance limit than crankshafts manufactured from SAE 1548 steel, particularly at the lower sulfur levels. The estimated endurance limits for the TMS-80 steels ranged from 793 to 910 Mpa (115 to 132 ksi), while that of the 1548 steels was 724 to 772 Mpa (105 to 112 ksi). The endurance limits between the various sulfur levels of TMS-80 heats indicates that increasing the sulfur level has a detrimental effect on fatigue strength. The estimated endurance limits for the low, medium and high sulfur level versions of TMS-80 were 910 Mpa (132 ksi), 841 Mpa (122 ksi) and 793 Mpa (115 ksi), respectively.

Figure 5:
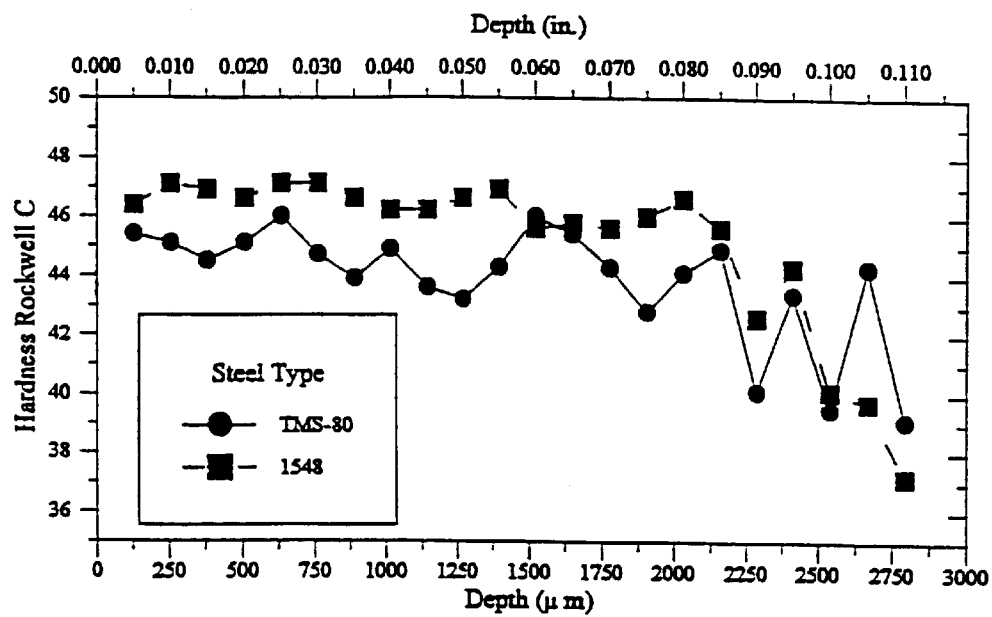
FIG. 5 is a graph of hardness Rockwell C versus depth for one TMS-80 crankpin journal section from heat 12674 and for one 1548 crankpin journal section from heat X8814 (Wilson Rockwell Microficial values converted to HRC)

Fatigue tested samples were sectioned in the critical (high stress) fillet regions and metallographically evaluated for case hardness, case depth, and microstructure. Typical microhardness traverse data is shown in FIG. 5. Although the goal of the component processing was to produce parts from both materials with similar case depths to 45 HRC and case hardness levels, the TMS-80 samples did not consistently achieve the same properties as the SAE 1548 samples. Evaluation of the TMS-80 samples revealed significant levels of undissolved ferrite and the presence of bainite in the case microstructure. This was due, respectively, to the coarser core microstructure and lower hardenability of the TMS-80 material. The core mechanical properties were also measured on crankshafts from each of the heats, and the results are listed in Table II.

Figure 6:
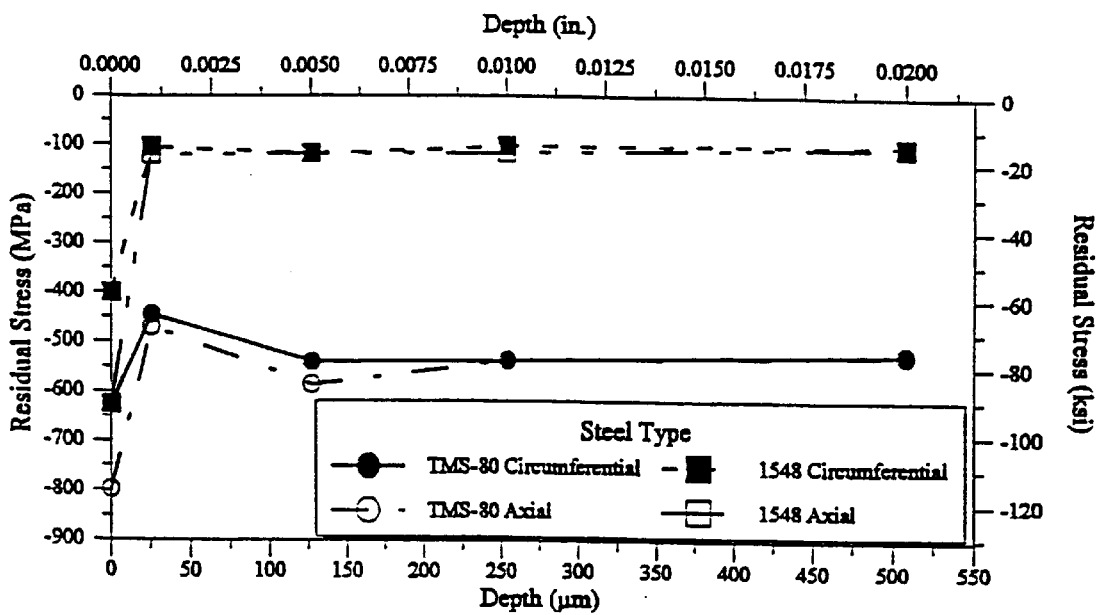
FIG. 6 is a graph of X-ray diffraction residual stress values measured in both the circumferential and axial directions versus depth beneath the surface for one TMS-80 (T1498) and one 1548 (T0509) crankpin journal surface location.

Since the hardness and microstructure data did not reveal the reasons for the differences in component fatigue strength between the steel types, residual stresses were measured on untested crankpin fatigue specimens. Depth profiles were obtained from the crankpin O.D., on both the TMS-80 and the SAE 1548 steels, using a TEC Model 1610 X-ray diffractometer (FIG. 6). Near surface residual stresses were also measured in the crankpin fillet region, and were not found to differ significantly from the O.D. values. The near surface residual stresses were approximately the same for both materials, presumably because these stresses were primarily a function of the grinding and lapping process and were somewhat insensitive to relatively subtle differences in material properties. The residual stresses at depths greater than approximately 25 $\mu$m (0.001") were, however, significantly different. In this region, which is mostly influenced by the heat treatment response of the material, the TMS-80 microalloy steel had a compressive residual stress four to five times that of the 1548 steel (approximately 538 Mpa [78 ksi] versus 110 Mpa [16 ksi] for the respective materials).

Experimental VIM Matrix

A series of vacuum induction melted (VIM) heats were melted to determine the role of carbon level, vanadium level and tempering temperature on the resultant residual stress state of induction hardened steels.

Procedure. The heat matrix compositions for this study are listed in Table III, and includes the TMS-80 composition, a non-vanadium version of TMS-80 (1530 type steel), and a current production SAE 1548 composition. The steels were melted in a 45 kg (100 lb.) laboratory VIM furnace, and cast into approximately 101 mm (4") square molds. The castings were heated to 1232° C. (2250° F.), and forged into 70 mm (2.75") round bars having a length of 1.02 m (40"), followed by an air cool to room temperature. This forging process was intended to produce an as-forged cross section, microstructure and hardness similar in size to that of an as-forged crankshaft crankpin section. The bars were then machined to a 66.7 mm (2.625") round diameter, prior to performing the heat treating.

TABLE II

Core Mechanical Properties of Fatigue Tested Crankshafts

| Type | Heat | Tensile Strength MPa (Ksi) | Yield Strength MPa (Ksi) | Percent Elongation | Percent Reduction of Area |
|---|---|---|---|---|---|
| TMS-80 | 12674 | 833.6 (120.9) | 591.6 (85.8) | 16.8 | 41.1 |
| TMS-80 | T1498 | 789.5 (114.5) | 564.0 (81.8) | 20.0 | 51.5 |
| TMS-80R | T1044 | 812.2 (117.8) | 525.4 (76.2) | 15.0 | 33.2 |
| SAE 1548 | X8814 | 796.3 (115.5) | 499.9 (72.5) | 22.0 | 52.0 |
| SAE 1548 | T0509 | 756.4 (109.7) | 451.6 (65.5) | 26.0 | 56.5 |

TABLE III

Chemical Compositions of the Vacuum Induction Melted Steels (Weight Percent)

| Type | C | Mn | S | Si | Cr | Ni | Mo | Cu | Al | V | O | N |
|---|---|---|---|---|---|---|---|---|---|---|---|---|
| TMS-80 | 0.30 | 1.38 | 0.010 | 0.26 | 0.11 | 0.12 | 0.03 | 0.16 | 0.021 | 0.11 | 0.0026 | 0.0088 |
| 1530 | 0.30 | 1.45 | 0.007 | 0.25 | 0.11 | 0.11 | 0.03 | 0.16 | 0.019 | — | 0.0023 | 0.0093 |
| 1543 | 0.47 | 1.15 | 0.008 | 0.25 | 0.12 | 0.10 | 0.03 | 0.16 | 0.018 | — | 0.0018 | 0.0093 |

The induction hardening and tempering was performed utilizing an Inductoheat Statipower brand unit, with a power-time cycle that attempted to duplicate the time-temperature cycle experienced on a crankshaft crankpin fillet. The induction heating unit develops a frequency of 10 kHz, and the cycle was run for 22.5 seconds at 42.5 kW power using a 23 mm (0.9") wide by 82.5 mm (3.25") I.D. coil, followed by an integral water quench containing four percent polymer solution. Each bar was hardened at eight locations along the length. The bars were then sectioned between the induction hardened areas, thereby resulting in eight induction hardened samples per steel type. The induction hardened bar samples, except for one as-quenched sample per steel, were then furnace tempered at temperatures of 177° C. (350° F.), 246° C. (475° F.), 274° C. (525° F.), 357° C. (675° F.), 468° C. (875° F.), 510° C. (950° F.), or 579° C. (1075° F.) for a period of three hours.

X-ray diffraction residual stress measurements were made at three separate laboratories on the induction hardened and tempered bars. Each laboratory measured the stresses in the circumferential direction in the middle of the induction hardened band utilizing Cr Kα radiation and a 3 mm round collimator. Stresses were measured at the surface and at nominal depths of 25.4 μm (0.001") and 127 μm (0.005") (depths obtained by electropolishing) at one location per sample. The as-quenched samples and the samples tempered at 246° C. (475° F.) and 357° C. (675° F.) were measured at a first laboratory on a TEC Model 1630-3 unit, the samples tempered at 177° C. (350° F.), 274° C. (525° F.), and 579° C. (1075° F.) were measured at a second laboratory facility on a TEC Model 1610 unit, and the samples tempered at 468° C. (875° F.) and 510° C. (950° F.) were measured at a third laboratory on an AST Model X2002 unit. The results from each laboratory were normalized to a common elastic constant $(E/(1+\upsilon))=170{,}135$ Mpa (24,676 ksi). Samples were also measured at the different laboratories to verify consistency between the X-ray units. The difference in values between the first and second laboratories was less than three percent, indicating good agreement. The difference between the first and third laboratories was slightly larger, but since the values were closer to zero, the overall trends were not significantly different.

The bar sections were then sectioned to remove metallographic samples for hardness profile measurements and microstructure characterization. One longitudinal section containing the induction hardened surface to the core region was prepared from each sample. Hardness profiles were performed on each sample utilizing a Wilson Rockwell Microficial hardness tester with a 1000 g load or a Leco M-400-G hardness tester with a Vickers indenter and a 1000 g load, The samples were measured at increments of 127 μm (0.005") from the surface through the case. The samples were then examined metallographically.

Figure 7:
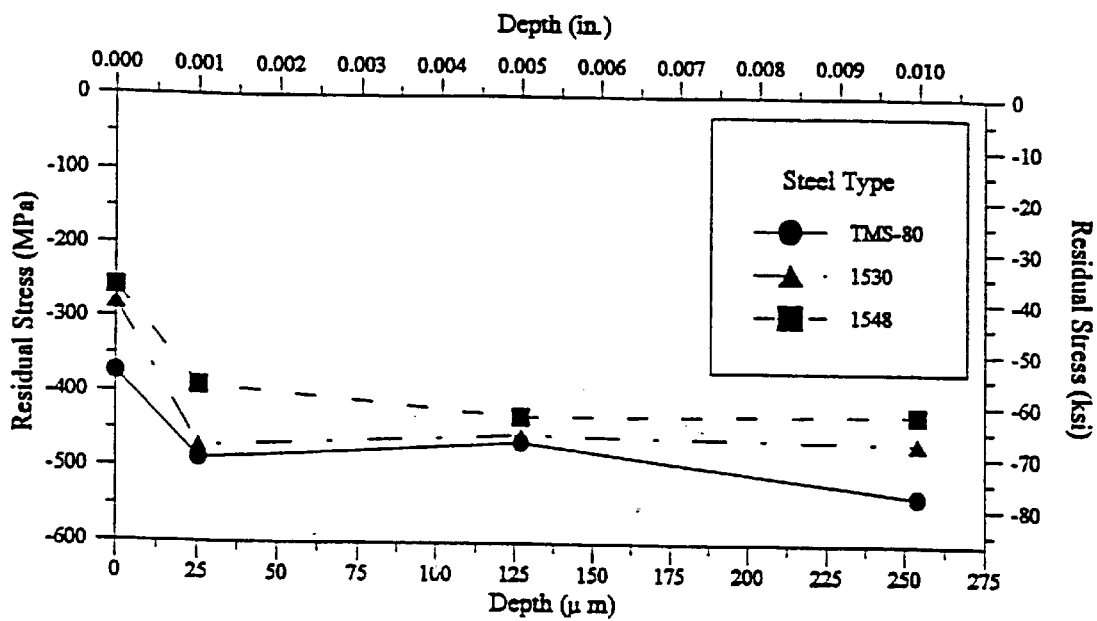
FIG. 7 is a graph of residual stress versus depth for all the steels tested, tempered at 246° C. (475° F.)

Results. The residual stress data is listed for each steel type, tempering temperature and measured depth in Table IV. The results at each tempering temperature indicate that the surface stress values are significantly less compressive than the values below the surface up to around 274° C. (525° F.). Above this temperature, the values for all depths of a given sample were fairly uniform, within testing error. The values tended to level off below depths of 25.4 μm (0.001"), as is shown for each steel tempered at 246° C. (475° F.) in FIG. 7. These samples (and a number of others) were actually tested to a depth of 254 μm (0.010") to verify that the stress level did not change with further depth. Based on these results, the stress values at 127 μm (0.005") depth were chosen for further analysis, being representative of the case subsurface residual stress for each sample.

TABLE IV

X-ray Residual Stress and Hardness Results

| Steel Type | Tempering Temperature °C. (°F.) | Stress in Depth - MPa (Ksi)* | | | Hardness (HRC)** |
|---|---|---|---|---|---|
| | | Surface | 25.4 μm (0.001") | 127 μm (0.005") | |
| TMS-80 | As quenched | −467.5 (−67.8) | −806.7 (−117.0) | −865.3 (−125.5) | 48.0 |
| TMS-80 | 177 (350) | −270.5 (−39.2) | −755.2 (−109.5) | −691.4 (−100.3) | 49.9 |
| TMS-80 | 246 (475) | −373.7 (−54.2) | −488.8 (−70.9) | −466.1 (−67.6) | 46.6 |
| TMS-80 | 274 (525) | −248.4 (−36.0) | −469.6 (−68.1) | −405.7 (−58.8) | 45.8 |
| TMS-80 | 357 (675) | −200.6 (−29.1) | −222.0 (−32.2) | −277.2 (−40.2) | 42.1 |
| TMS-80 | 468 (875) | −68.2 (−9.9) | −75.8 (−11.0) | −72.8 (−10.6) | 36.3 |
| TMS-80 | 510 (950) | −28.3 (−4.1) | −46.0 (−6.7) | −53.1 (−7.7) | 34.3 |
| TMS-80 | 579 (1075) | −3.8 (−0.5) | −13.9 (−2.0) | −13.3 (−1.9) | 32.8 |
| 1548 | As quenched | −591.6 (−85.8) | −872.9 (−126.6) | −942.5 (−136.7) | 59.3 |
| 1548 | 177 (350) | −455.7 (−66.1) | −733.1 (−106.3) | −721.7 (−104.7) | 56.3 |
| 1548 | 246 (475) | −257.9 (−37.4) | −390.9 (−56.7) | −431.6 (−62.6) | 52.8 |
| 1548 | 274 (525) | −193.4 (−28.0) | −261.0 (−37.9) | −301.5 (−43.7) | 50.0 |
| 1548 | 357 (675) | −142.0 (−20.6) | −111.7 (−16.2) | −149.6 (−21.7) | 46.8 |
| 1548 | 468 (875) | −10.6 (−1.5) | −11.6 (−1.7) | −14.2 (−2.1) | 37.1 |
| 1548 | 510 (950) | −6.1 (−0.9) | −6.6 (−1.0) | −6.6 (−1.0) | 35.0 |

TABLE IV-continued

X-ray Residual Stress and Hardness Results

| Steel Type | Tempering Temperature °C. (°F.) | Stress in Depth - MPa (Ksi)* | | | Hardness (HRC)** |
|---|---|---|---|---|---|
| | | Surface | 25.4 μm (0.001") | 127 μm (0.005") | |
| 1548 | 579 (1075) | −49.3 (−7.1) | −41.7 (−6.0) | −20.9 (−3.0) | 26.8 |
| 1530 | As quenched | −381.3 (−55.3) | −788.1 (−114.3) | −878.4 (−127.4) | 51.1 |
| 1530 | 177 (350) | −322.3 (−46.7) | −748.3 (−108.5) | −695.2 (−100.8) | 50.0 |
| 1530 | 246 (475) | −279.9 (−40.6) | −471.6 (−68.4) | −455.7 (−66.1) | 46.0 |
| 1530 | 274 (525) | −247.1 (−35.8) | −348.2 (−50.5) | −396.2 (−57.5) | 43.6 |
| 1530 | 357 (675) | −156.5 (−22.7) | −217.9 (−31.6) | −229.6 (−33.3) | 42.7 |
| 1530 | 468 (875) | −46.5 (−6.7) | −48.0 (−7.0) | −54.6 (−7.9) | 33.4 |
| 1530 | 510 (950) | −20.2 (−2.9) | −20.2 (−2.9) | −34.4 (−5.0) | 31.4 |
| 1530 | 579 (1075) | −29.7 (−4.3) | −20.2 (−2.9) | −21.5 (−3.1) | 23.7 |

*The electropolished depths are nominal. Refer to the text for a description of where each of the samples was measured. The values have not been corrected for material removal.
**The hardness values represent an average hardness in the induction hardened depth converted from 100 g Microficial or Vickers numbers.

Figure 8:
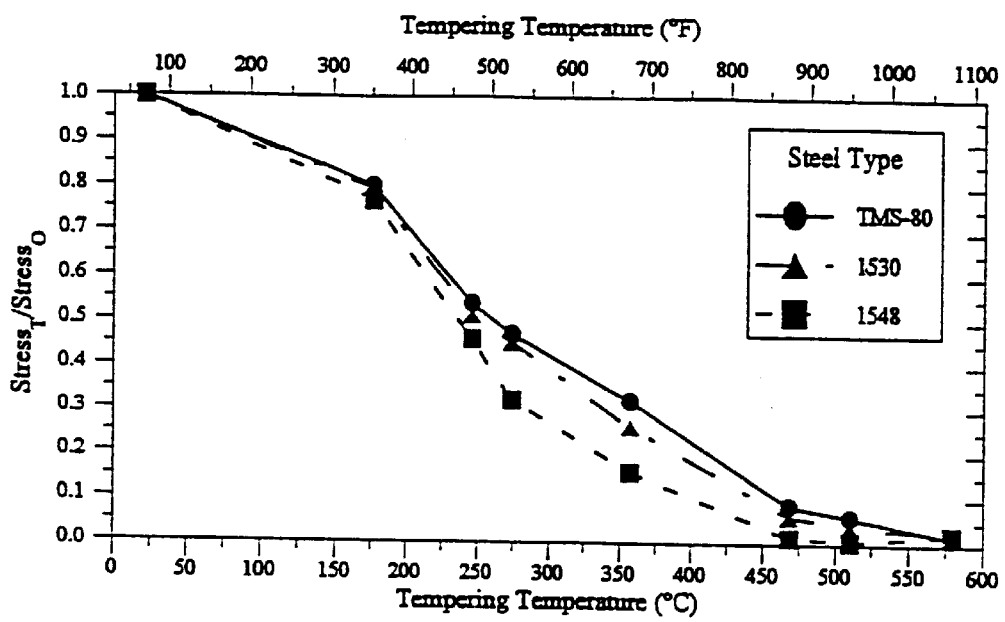
FIG. 8 is a graph showing effect of tempering temperature on residual stress at 127 μm (0.005") depth for each steel type, the residual stress ratio is the residual stress at each tempering temperature ($Stress_T$) divided by the as-quenched residual stress ($Stress_O$)

The residual stress data is graphically summarized in FIG. 8, which is a plot of normalized residual stress at 127 μm (0.005") depth versus tempering temperature for all three steels. The data has been normalized by calculating the ratio of the stress level at each tempering temperature to the as-quenched stress level. This plot illustrates the strong dependence of stress relaxation on tempering temperature, with the magnitude of compressive stress decreasing as the tempering temperature is increased. A small loss in residual stress occurs following tempering at lower temperatures up to 177° C. (350° F.), rapid stress relaxation occurs at tempering temperatures between 177° C. (350° F.) and 468° C. (875° F.), and residual stress approaches zero above 468° C. (875° F.). Although the 1548 steel displays a slightly higher level of as-quenched residual compressive stress (approximately 931 Mpa [135 kis] versus 862 Mpa [125 ksi] for the 0.30% carbon steels) at the higher tempering temperatures it undergoes the most rapid stress relaxation of the three steels. This is most apparent at the 274° C. (525° F.) tempering condition up to the 510° C. (950° F.) tempering condition, where the 1530 and TMS-80 steels retain a higher fraction of compressive stress in comparison to the 1548 steel.

Figure 9:
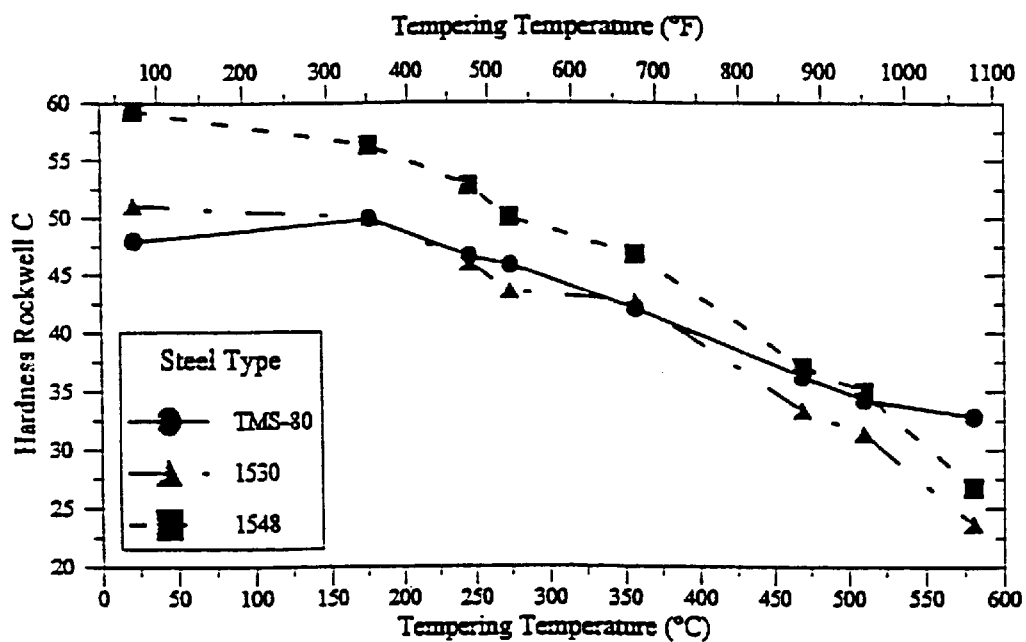
FIG. 9 is a graph showing average Rockwell C hardness of the hardened depth for each tempering temperature and steel type (values converted from 1000 g Microficial or Vickers numbers)

The average hardnesses obtained from the case hardness traverses are included in Table IV. The effect of tempering temperature on the hardness of each steel type is depicted in FIG. 9, illustrating the general trend of decreasing hardness with increasing tempering temperature. The 1548 steel displays the highest hardnesses in the as-quenched condition up through the 510° C. (950° F.) tempering condition, while the 1530 and TMS-80 steels display nearly identical, but lower hardnesses, over this same range. At the 579° C. (1075° F.) tempering condition, the TMS-80 shows a significantly higher level of hardness than either the 1548 or 1530 steels due to the resistance to tempering of the vanadium carbides present in that grade. The microstructure of the as-forged core region of all three steels was composed of coarse pearlite outlined with ferrite. The case microstructure was composed primarily of martensite tempered to various extents depending on the tempering temperature. The 0.30% carbon steels also displayed significant levels of undissolved ferrite and bainite in the case microstructures due to the lower hardenability of these steels compared to 1548. These microstructures, and the differences observed between the steel types, were consistent with those found in the crankshafts.

The present work has demonstrated that the sulfur level influences bending fatigue strength indicating that fatigue performance can be improved by lowering the base sulfur level of the steel. These results are in agreement with several prior art studies of Erven, Collins et al. and Sanders which also observed that bending fatigue is influenced by sulfur level and sulfide morphology in ultra clean air melt steels. The strong effect of sulfur level on fatigue strength observed in the present work suggests that sulfides play a role in fatigue initiation. Therefore, in order to optimize the component fatigue life, the sulfur level of the steel must be kept as low as possible. Consequently, the core hardness and microstructure must be optimized to facilitate machining at these lower sulfur levels. Early prototype production crankshaft results and an outside laboratory machinability comparison of the 1548 and the TMS-80 steels have indicated that the lower sulfur version of TMS-80 machines are similar to or better than the nominal sulfur level 1548 steel.

Figure 10:
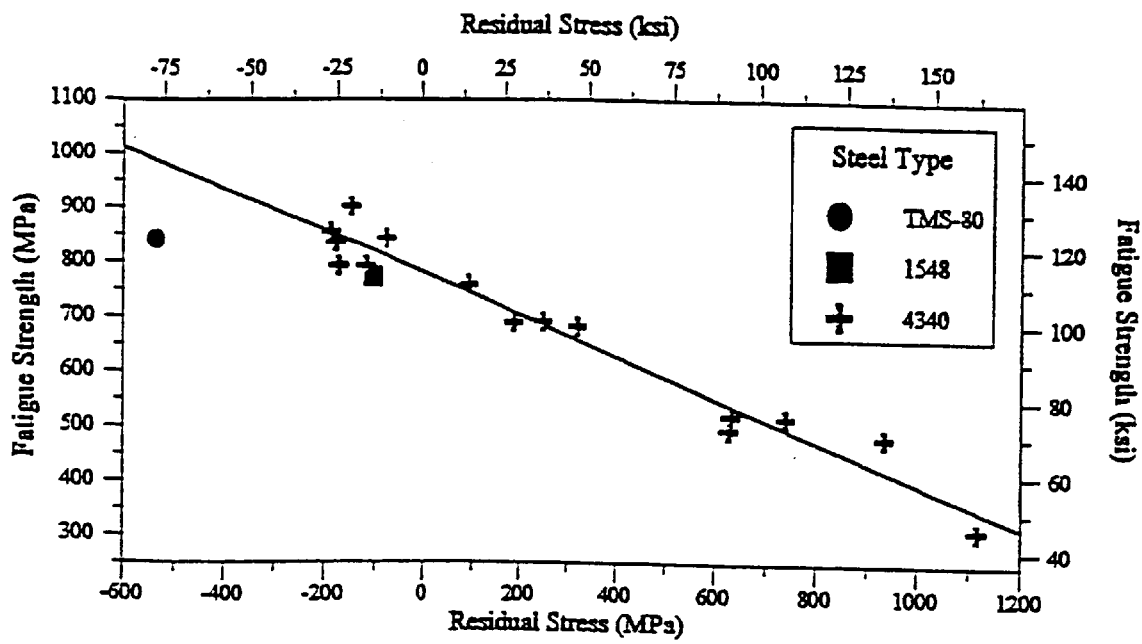
FIG. 10 is a graph showing bending fatigue strength as a function of residual stress for 4340 steels hardened, tempered and ground to 50 HRC in the prior art study by Koster, and two crankshaft data points from this investigation, the TMS-80 data point is from heat T1498, and the 1548 data point is from heat T0509, tempered at 246° C. (475° F.) and 357° C. (675° F.), respectively, to 46/48 HRC.

The differences in component fatigue strength between the two materials were consistent with the measured differences in subsurface residual stress level. The resultant residual stress level of the induction hardened regions was the only observed significant difference between crankshafts manufactured from the two steel types. Other prior art investigators have found a clear trend between the level of residual stress present and bending fatigue strength. In the study by Koster, referenced herein above, the bending fatigue strength of SAE 4340 steel samples hardened to 50 HRC was measured over a range of residual stress levels from highly tensile to compressive. These results, shown in FIG. 10, illustrate a linear trend of increasing fatigue strength with increasing compressive stress level. The fatigue results from one TMS-80 condition and one 1548 condition (both at approximately 0.020% sulfur level) are also included on the plot. The hardness level of the fatigue tested components from this investigation lie just below Koster's curve, but the overall trend of the fatigue strength versus residual stress level is in line therewith. Based on this comparison to Koster's work, it is probable that the difference in fatigue strength between the TMS-80 and 1548 crankshafts is due to the difference in measured residual stress levels. We have found that the differences in residual stress level between the crankshafts is due largely to the differences in tempering temperature applied to achieve the same final hardness level. FIG. 8 illustrates the strong effect of tempering temperature on residual stress relaxation. The magnitude of residual stress reduction over the range of tempering temperatures reported here has been demonstrated by a number of other investigators for various medium carbon steels. Their results also tend to show a small loss in residual stress below a tempering temperature of around 200° C. (392° F.) and a rapid loss in stress between 200° C. (392° F.) and around 450° C. (842° F.), above which the retained stress is minimal. Because 1548 has a higher as-quenched hardness than TMS-80, it requires a higher tempering temperature to achieve the same final hardness level. The final compressive stress level for induction hardened and tempered 1548 is therefore lower than that for TMS-80, at the same hardness level.

Figure 11:
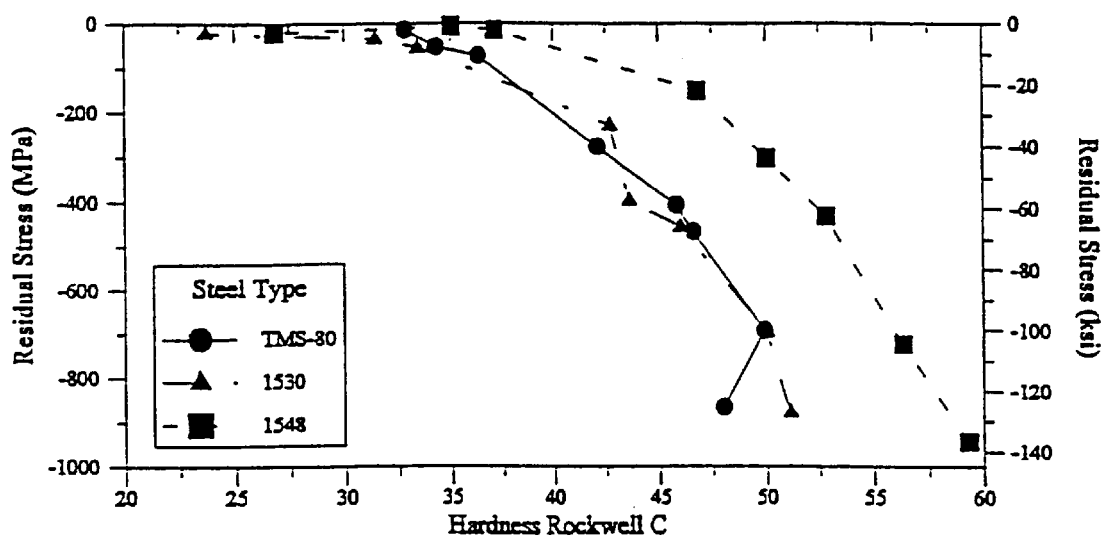
FIG. 11 is a graph showing residual stress results at 127 μm (0.005") depth versus Rockwell C hardness in the hardened depth for each steel type and tempering temperature.

The combined results from the effects of tempering on hardness and residual stress are depicted in FIG. 11. This figure displays the residual stress as a function of hardness level for each of the steels throughout the tempering range. It is noted that the 1530 and TMS-80 data are nearly identical except for the hardnesses at the highest tempering condition, and that the 1548 steel shows a markedly different trend compared to the 0.30% carbon grades. The fact that the 1548 grade is displaced to the right of the 1530 and TMS-80 plots on this graph indicates that at a given hardness level, the 1548 steel is consistently lower in compressive stress level. As an example, both the 0.30% and 0.48% carbon steels achieved a hardness level of 46 to 47 HRC following tempering at 246° C. (475° F.) and 357° C. (675° F.), respectively, but the 0.30% carbon steels maintained a compressive stress of around 480 Mpa (70 ksi) while the compressive stress level of 1548 had decreased to 112 Mpa (16 ksi). As was noted above for the crankshafts, the primary reason for this shift in residual stress at a given hardness level for steels at different carbon levels is due to the difference in the tempering response. Furthermore, FIG. 8 shows that both of the 0.30% carbon steels retain a higher fraction of compressive stress than the 1548 steel at all tempering temperatures between 274° C. (525° F.) and 510° C. (950° F.). The compositions of these steels varied significantly only in the amounts of carbon and manganese present. Both of the 0.30% carbon steels had a manganese level of approximately 1.4%, while the 1548 steel had a manganese level of 1.15%. The relaxation of residual stresses is related to recovery mechanisms involving the movement and annihilation of the high density of dislocations formed during the transformation process. Thus, it is reasonable to conclude that carbon and/or manganese is responsible for the noted difference in the stress relaxation characteristics.

The present invention has a variety of practical implications that leads to enhanced bending fatigue strength of induction hardened and tempered parts. Most of these benefits are realized by proper material selection for a component. Primarily, the carbon level must be optimized to allow a low tempering temperature and maximum residual stress level. Ideally, the steel should contain just enough carbon, for example 0.15 wt. %, to reach the required surface hardness level following induction hardening and low temperature tempering at approximately 177° C. (350° F.). Additionally, the sulfur level of the steel should be kept as low as possible preferably less than 0.10 wt. % or, even more preferably less than 0.02 wt. %, to further enhance fatigue strength. Many microalloy or other carbon steels are capable of attaining the required core properties in the as-formed condition while maintaining a machineable, ferrite and pearlite microstructure with low sulfur levels. Thus, the present invention is beneficial for optimizing the fatigue performance of many current or potential induction hardened components.

That data reported herein show that a decrease in the sulfur level of TMS-80 steel applied to production manufactured crankshafts correlates with higher component bending fatigue life. In addition, we have shown that an increase in the compressive residual stress level of the induction hardened crankshaft crankpins correlates with higher component bending fatigue life. The crankshafts manufactured from TMS-80 steel were shown to have a higher fatigue endurance limit and a higher compressive residual stress level in the critical tested region as compared to the 1548 crankshafts.

We have also determined that the final residual stress level present following an induction hardening and tempering operation is primarily a function of tempering temperature with the residual stress decreasing with increasing tempering temperature. The stress relaxation is most pronounced over the temperature range of 177° C. (350° F.) to 468° C. (875° F.). Our work reported hereinabove further indicates that the decrease in residual stress with increasing tempering temperature is also influenced by chemical composition. The lower carbon, higher manganese steels studied (1530 and TMS-80) showed a retarded relaxation rate versus temperature as compared to the higher carbon, lower manganese steel (1548). The lower carbon steels studied displayed a similar hardness decrease with increasing tempering temperature, both of which were lower in hardness as compared to the 1548 steel at a given tempering temperature. The exception to this trend occurred at the highest tempering temperature of 579° C. (1075° F.), where the vanadium containing TMS-80 had the highest hardness level. The combined results of hardness versus residual stress following induction hardening and tempering indicate that the lower carbon steels retain a higher level of compressive stress at any given hardness level. This is primarily a result of the fact that the higher carbon steel (1548) had to be tempered at a higher temperature (resulting in great stress relaxation) to achieve the same hardness level as compared to the lower carbon steels.

It will be readily appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting to the scope of the invention which is to be given the full breadth of the appended claims and any and all equivalents thereof.

What is claimed is:

1. A method of making a steel article resistant to bending fatigue comprising the steps of:
   a) providing a steel having a composition consisting essentially of, in % by weight:
      0.15 to 0.45 C,
      0.50 to 1.60 Mn,
      0.0 to 0.20 V,
      0.001 to 0.10 S,
      balance essentially Fe; and
   b) induction hardening selected surfaces of the steel article.

2. The method of claim 1 including the step of tempering the steel article at a selected temperature to achieve a desired surface hardness and residual compressive stress level.

3. The method of claim 2 wherein the tempering temperature is between about 175° C. (350° F.) to 350° C. (660° F.).

4. A steel article having a composition consisting essentially of the following constituents in % by weight: 0.15 to 0.45 carbon (C); 0.50 to 1.60 manganese (Mn); 0.0 to 0.20 vanadium (V); 0.001 to 0.10 sulfur (S) and balance essentially iron (Fe); and said steel article having at least one induction hardened surface.

5. The steel article of claim 4 wherein said article is in a tempered condition having a desired case hardness and residual compressive stress level.

6. The steel article of claim 5 wherein the tempering temperature is no greater than about 350° C. (660° F.).

7. The steel article of claim 6 in the form of a crankshaft.

8. A method of making a steel article resistant to bending fatigue comprising the steps of:

a) providing a steel having a composition consisting essentially of, in % by weight:
0.20 to 0.35 C,
1.00 to 1.50 Mn,
0.05 to 0.15 V,
0.001 to 0.06 S,
balance essentially Fe; and b) induction hardening selected surfaces of the steel article.

9. The method of claim 8 including the step of tempering the steel article at a selected temperature to achieve a desired surface hardness and residual compressive stress level.

10. The method of claim 9 wherein the tempering temperature is between about 175° C. (350° F.) to 350° C. (660° F.).

11. A steel article resistant to bending fatigue having a composition consisting essentially of the following constituents in % by weight: 0.20 to 0.35 carbon (C); 1.00 to 1.50 manganese (Mn); 0.05 to 0.15 vanadium (V); 0.001 to 0.008 sulfur (S) and balance essentially iron (Fe); and said steel article having at least one induction hardened surface.

12. The steel article of claim 11 wherein said article is in a tempered condition having a desired case hardness and residual compressive stress level.

13. The steel article of claim 12 wherein the tempering temperature is between about 175° C. (350° F.) to 350° C. (660° F.).

14. The steel article according to claim 13 in the form of a crankshaft.

15. A method of making a crankshaft resistant to bending fatigue comprising the steps of:

a) providing a microalloy steel having a composition consisting essentially of, in % by weight:
0.20 to 0.35 C,
1.00 to 1.50 Mn,
0.05 to 0.15 V,
0.001 to 0.06 S,
balance essentially Fe;

b) fabricating a crankshaft from said steel composition;

c) induction hardening selected surfaces of the crankshaft; and d) tempering the crankshaft at a selected temperature on the order of 200° C. (400° F.) to 290° C. (550° F.) to achieve a desired surface hardness and residual compressive stress level.

* * * * *

UNITED STATES PATENT AND TRADEMARK OFFICE
CERTIFICATE OF CORRECTION

PATENT NO.   : 5,906,691
DATED        : May 25, 1999
INVENTOR(S)  : Michael E. Burnett and Carl F. Musolff It is certified that error appears in the above-identified patent and that said Letters Patent is hereby corrected as shown below:

Title Page, [57] ABSTRACT, Line 5 "0.0001%" should read --0.001%--.

Column 4 Table I, first row, under "Type": "IMS-80" should read --TMS-80--.

Column 8 Line 27 after "g load" delete comma and insert period --.--.

Signed and Sealed this

Twenty-third Day of November, 1999

Attest:

Q. TODD DICKINSON

*Attesting Officer*                *Acting Commissioner of Patents and Trademarks*